(12) United States Patent
Rodriguez

(10) Patent No.: US 9,914,059 B2
(45) Date of Patent: Mar. 13, 2018

(54) VIRTUAL LEAGUE PLATFORM OF A SPORT ACTIVITY

(71) Applicant: BEAT YOUR MARK GROUP LIMITED, Triq il-Prinjolata, Ta' Xbiex (MT)

(72) Inventor: Federico Rodriguez, Palma de Mallorca (ES)

(73) Assignee: Beat Your Mark Group Limited, Ta'Xbiex (MT)

( * ) Notice: Subject to any disclaimer, the term of this patent is extended or adjusted under 35 U.S.C. 154(b) by 490 days.

(21) Appl. No.: 14/585,071

(22) Filed: Dec. 29, 2014

(65) Prior Publication Data

US 2015/0360134 A1 Dec. 17, 2015

Related U.S. Application Data

(63) Continuation-in-part of application No. 14/521,076, filed on Oct. 22, 2014, now Pat. No. 9,767,350, which
(Continued)

(51) Int. Cl.
| | |
|---|---|
| *G06F 19/00* | (2011.01) |
| *A63F 13/828* | (2014.01) |
| *G06Q 10/06* | (2012.01) |
| *G06Q 50/00* | (2012.01) |
| *A63F 13/35* | (2014.01) |

(52) U.S. Cl.
CPC ........... *A63F 13/828* (2014.09); *G06Q 10/06* (2013.01); *G06Q 50/01* (2013.01); *A63F 13/35* (2014.09)

(58) Field of Classification Search
CPC ........ A63F 13/12; A63F 13/65; A63F 13/798; A63F 13/828; A63B 24/0062; A63B 2220/00; A63B 2220/10; A63B 2220/14; A63B 2220/20; A63B 2220/62; A63B 2220/80; A63B 2225/20; A63B 2225/50; A63B 71/06; A63B 71/0616; A63B 71/0619; A63B 2071/0694; A61B 2503/10
See application file for complete search history.

(56) References Cited

U.S. PATENT DOCUMENTS

| | | | |
|---|---|---|---|
| 6,885,971 B2 | 4/2005 | Vock et al. | |
| 7,901,292 B1 * | 3/2011 | Uhlir | A63F 13/216 463/39 |

(Continued)

OTHER PUBLICATIONS

International Search Report, PCT/EP2015/062614, dated Jul. 22, 2015, 3 pages.
(Continued)

*Primary Examiner* — Milap Shah
(74) *Attorney, Agent, or Firm* — Choate, Hall & Stewart LLP; William R. Haulbrook; Alexander D. August

(57) ABSTRACT

The present disclosure describes a platform that allows individual users to compete against other users in a virtual league. The platform allows individual users to maintain personal performance statistics, which, collectively, are used to determine a projection result of the user's performance in a competition within the league. The platform employs projection result, in combination with, or as a substitute for, results associated with a real race completed by the user, in the scoring of the user against other competitors in the league.

31 Claims, 5 Drawing Sheets

Related U.S. Application Data is a continuation of application No. 14/466,350, filed on Aug. 22, 2014, now Pat. No. 8,903,522.

(60) Provisional application No. 62/012,877, filed on Jun. 16, 2014.

(56) References Cited

U.S. PATENT DOCUMENTS

| | | | | |
|---|---|---|---|---|
| 7,927,253 B2* | 4/2011 | Vincent | A63B 24/0021 | 482/1 |
| 8,121,785 B2* | 2/2012 | Swisher | A63B 24/0062 | 701/423 |
| 8,182,348 B2 | 5/2012 | Uhlir et al. | | |
| 8,388,443 B1* | 3/2013 | Korey | A63F 13/812 | 463/31 |
| 8,548,610 B1* | 10/2013 | Howell | G06Q 10/0639 | 273/317.4 |
| 8,903,522 B1* | 12/2014 | Rodriguez | G06K 9/00342 | 463/7 |
| 9,460,050 B2* | 10/2016 | Walsh | A63B 33/00 | |
| 9,767,350 B2* | 9/2017 | Rodriguez | G06K 9/00342 | |
| 2002/0010697 A1* | 1/2002 | Marshall | G06F 17/30873 | |
| 2002/0115488 A1* | 8/2002 | Berry | A63F 13/12 | 463/42 |
| 2002/0161461 A1* | 10/2002 | Lobb | A61B 1/00059 | 700/90 |
| 2003/0092378 A1* | 5/2003 | Satoh | A63B 24/0006 | 455/11.1 |
| 2004/0225467 A1* | 11/2004 | Vock | A63C 5/06 | 702/142 |
| 2005/0014113 A1* | 1/2005 | Fleck | A61B 5/0002 | 434/247 |
| 2005/0209717 A1* | 9/2005 | Flint | A63F 13/12 | 700/91 |
| 2006/0136173 A1* | 6/2006 | Case, Jr. | A63B 24/00 | 702/182 |
| 2006/0161500 A1* | 7/2006 | Franzone | G06Q 20/1085 | 705/43 |
| 2007/0244878 A1* | 10/2007 | Hulme | A63F 13/12 | |
| 2008/0015819 A1* | 1/2008 | Sayre | A63B 71/06 | 702/187 |
| 2008/0096726 A1* | 4/2008 | Riley | A63B 24/0006 | 482/8 |
| 2008/0146339 A1* | 6/2008 | Olsen | A63F 13/12 | 463/42 |
| 2008/0188330 A1* | 8/2008 | Doherty | A63B 69/36 | 473/407 |
| 2008/0200284 A1* | 8/2008 | Doherty | A63B 24/0021 | 473/407 |
| 2008/0256031 A1* | 10/2008 | Chen | G06F 17/30528 | |
| 2008/0278314 A1* | 11/2008 | Miller | G07C 5/008 | 340/539.13 |
| 2008/0281444 A1* | 11/2008 | Krieger | A63F 13/12 | 700/91 |
| 2009/0036214 A1* | 2/2009 | Dahl | G06Q 10/00 | 463/42 |
| 2009/0149974 A1* | 6/2009 | Storch | A63B 24/0021 | 700/91 |
| 2009/0259566 A1* | 10/2009 | White | A63B 24/0062 | 705/26.1 |
| 2009/0297627 A1* | 12/2009 | Tanelian | A61K 45/06 | 424/643 |
| 2010/0004039 A1* | 1/2010 | Kelly, Jr. | G09B 7/00 | 463/3 |
| 2010/0004097 A1* | 1/2010 | D'Eredita | A63B 24/0087 | 482/8 |
| 2010/0087936 A1* | 4/2010 | Roullier | A63B 71/0669 | 700/91 |
| 2010/0088023 A1* | 4/2010 | Werner | A63B 24/0021 | 701/467 |
| 2011/0145740 A1* | 6/2011 | McCue | G06F 19/3431 | 715/764 |
| 2011/0153042 A1* | 6/2011 | Burton | A63B 24/0062 | 700/91 |
| 2011/0230986 A1* | 9/2011 | Lafortune | A43B 3/0005 | 700/93 |
| 2011/0250937 A1* | 10/2011 | Hubbard | A61B 5/0002 | 463/6 |
| 2012/0179277 A1* | 7/2012 | Lymberopoulos | A63B 71/0616 | 700/91 |
| 2012/0310389 A1* | 12/2012 | Martin | G06F 19/3481 | 700/91 |
| 2012/0324010 A1* | 12/2012 | Pinches | G06Q 90/00 | 709/204 |
| 2013/0040272 A1* | 2/2013 | Booher | A61B 5/7267 | 434/254 |
| 2013/0053990 A1* | 2/2013 | Ackland | G06Q 30/02 | 700/91 |
| 2013/0171594 A1* | 7/2013 | Gorman | G09B 5/00 | 434/219 |
| 2013/0238106 A1* | 9/2013 | Ellis | A61B 5/1038 | 700/91 |
| 2013/0282640 A1* | 10/2013 | LaPadula, III et al. | G06N 5/02 | 706/46 |
| 2014/0081437 A1* | 3/2014 | Knapp | A63B 71/06 | 700/92 |
| 2014/0100007 A1* | 4/2014 | Kelly, Jr. | G06Q 50/01 | 463/3 |
| 2014/0163705 A1* | 6/2014 | Moller | A63F 13/00 | 700/92 |
| 2015/0126333 A1* | 5/2015 | Jones | G06F 19/3481 | 482/9 |
| 2015/0363406 A1 | 12/2015 | Rodriguez | | |

OTHER PUBLICATIONS

Written Opinion, PCT/EP2015/062614, dated Jul. 22, 2015, 10 pages.

* cited by examiner

VIRTUAL LEAGUE PLATFORM OF A SPORT ACTIVITY

CROSS-REFERENCE TO RELATED APPLICATIONS

This application is a continuation-in-part application and claims priority to and the benefit of U.S. application Ser. No. 14/521,076, filed Oct. 22, 2014, which is a continuation application of U.S. application Ser. No. 14/466,350, filed Aug. 22, 2014, and claims the benefit of U.S. Provisional Application No. 62/012,877, filed Jun. 16, 2014. The content of each of these applications is hereby incorporated by reference herein in its entirety.

BACKGROUND

Individuals who participate in multiple-stage sporting activities, such as triathlons, biathlons, and the like, may not reside in the particular location of a competition in which they wish to compete. Traditionally, individuals must train for a competition on local courses or physically move to the location of the upcoming competition in order to train for it. Usually, an individual has difficulty estimating, to a high degree of accuracy, how well he or she will be able to perform on an unfamiliar course.

In addition, training for a competition for a new participant may span several months. It is typically difficult for an individual to measure the progress of his or her training with respect to other competitors over such a period of time.

SUMMARY

The present disclosure addresses these difficulties by providing a platform for individuals to maintain personal performance statistics, which, collectively, are used to determine and update difficulty ratings for various multiple-stage sport courses and/or activities. The platform enables a user to predict his or her performance on an unfamiliar course based on course ratings and the individual's historical performance on other courses.

Furthermore, in certain embodiments, the platform allows practitioners, as well as athletes, to compete on a virtual basis in a virtual league against other practitioners. The league is virtual in that training data and/or predictions/projections of results are employed in combination with, or in substitution of, actual results of a real race completed by a given user, in the scoring of the user by the virtual league platform against other users in the league. The league provides milestones for a practitioner to evaluate and/or track the efficacy of his or her training with respect to other practitioners.

In addition, the virtual league promotes the socialization of multiple-stage sport and relay-race activities to further the goal of making multiple-stage sports and/or activities more accessible to the general public. The platform allows an amateur athlete or practitioner to compete in a league with other amateur athletes or practitioners based on their past performance and future races scheduled in the league. A series of handicaps is applied to the past performance of a given user based on goals specific to a given league (e.g., best performance for the individual, best improvement, etc.). Thus, any interested practitioners can compete in a multiple-stage sporting activity.

In addition, in certain embodiments, the races for each competitor in a given league may be customized and/or tailored for each competitor. A practitioner may beneficially compete against other practitioners in the same league without being constrained to a particular event schedule or geographic location. The platform can normalize results from races and training data of a practitioner to determine a score to which the practitioner can be ranked against other practitioner in the same league. Alternatively, in other embodiments, the races in a given league is the same for all competitors. The competitors may elect a set of races from a pre-defined set of races.

To participate in a league, the user provides training results and/or race performance results to the platform. The users of the platform can be the practitioners themselves, or a person providing data to the platform, such as a coach, an event official, or a league administrator. In some embodiments, training results are automatically submitted to the platform by a computing device associated with a user following a training session. Based on the past competitions and events results of the practitioner, the platform determines a score for such competitions and events. Using such past performance results and/or training profile of the user, the platform determines a projection result for selected competitions scheduled within league season of the practitioner. With the projection, a virtual score is determined for such league competitions. Scores from actual races or from projections are selectable by the practitioners, and the selected scores are combined to determine a ranking for the practitioner in the league. A series of handicaps is applied by the platform to the submitted results to allow different categories of winners and/or recognitions to be determined for a given league.

In certain embodiments, the platform provides a prediction of performance for a given course based on the present and/or historical training information. The platform may determine and update ratings for each leg of a given course and/or activity, allowing a user to predict his or her performance on each leg of the course and/or activity. Because an individual's performance level often varies for each of the multiple legs of a given competition (e.g., the swimming, cycling, and running legs of a triathlon), the platform enables a user to better choose a particular course and/or length (e.g., Ironman, Half Ironman, Olympic distance, and Sprint distance) to suit his or her strengths, or to challenge his or her weaknesses.

Thus, the platform enables an individual to predict his or her performance on an unfamiliar course based upon up-to-date course ratings and the individual's historic performance information on other courses. The information provided by the platform also allows the individual to more effectively train for an upcoming event on courses that are closer and more convenient to the individual. For example, course ratings allow a user to choose and train on courses that are similar in difficulty, leg-for-leg, to a course that will be used for an upcoming competition. The platform also enables a user to determine an individualized performance goal based on his or her historical performance information.

Moreover, the platform provides an updated ranking of athletes based on collective historical performance data gathered from users of the platform. The platform determines a rating—e.g., a par completion time or other performance standard(s)—for each leg of a given course (e.g., analogous to "par" for a given hole at a given course). Ratings may be further determined as a function of a given class of athlete—e.g., a given age category, gender, and/or elite or non-elite status. Thus, an individual is able to challenge himself or herself to beat the performance standard applicable to that individual based on one or more categories, for a given course at a given point in time (e.g., based on current course conditions).

In certain embodiments, the platform also allows for compensation of environmental conditions on the ratings for a given course. For example, upon entry by a user of performance data for a particular competition, course, and/or time, the platform may access weather information for that location and time and compensate for this information in the maintenance and/or determination of course and/or leg ratings.

Because course conditions may change over time, and because performance standards may change given improving performance of top athletes, the multi-user platform offers a way to account for those changes in real-time (or near real-time), for example, by providing updated course ratings. Furthermore, as an individual user enters more data as he or she performs more courses, the platform offers a way to track performance over time, such that improvement can be seen and quantified, even as the individual performs on different courses.

In one aspect, the present disclosure describes a method including receiving, over a network from a user of a remote computing device, a course performance submission. The course performance submission for one or all of the stages of a multiple-stage sport activity includes completion time information, a user identifier, a course identifier, and contextual identifiers. The contextual identifiers include at least one of a stage identifier identifying the one or more stages of the multiple-stage sport activity associated with the course performance submission, a competition identifier identifying a competition associated with the course performance submission, an ability level identifier identifying a user ability level associated with the course performance submission, and a distance rating identifier identifying a distance rating associated with the course performance submission. The method further includes accessing, by a processor of a computing device, one or more additional course performance submissions from multiple users, where the additional course performance submissions share the course identifier and at least one of the contextual identifiers. The method further includes determining, by the processor, based upon a portion of the course performance submissions received from the multiple users, an overall performance rating specific to each of the stages of the multiple-stage sport activity. The method further includes providing, based upon at least one of the contextual identifiers and the overall performance rating, an individualized performance goal for at least one stage of the multiple-stage sport activity.

In another embodiment, the multiple-stage sport activity is a triathlon. In another embodiment, the one or more stages of the multiple-stage sport activity comprise running, swimming, and bicycling. In another embodiment, the course identifier is determined based upon GPS location data. In another embodiment, the individualized performance goal is determined by adjusting the overall performance rating based upon the user ability level. In another embodiment, the overall performance rating is based on the subset of course performance submissions sharing a competition identifier. In another embodiment, the method further includes determining, based upon one or more course performance submissions sharing a user identifier and a distance rating, the user ability level associated with the user. In another embodiment, the user ability level comprises a stage ability level for each stage of the multiple-stage sport activity. In another embodiment, the user ability level comprises a stage ability level for each of running, swimming, and bicycling.

In another aspect, the present disclosure describes a system including, a processor and a memory. The memory has instructions that cause the processor to receive, over a network from a user of a remote computing device, a course performance submission. The course performance submission for one or all of the stages of a multiple-stage sport activity includes completion time information, a user identifier, a course identifier, and contextual identifiers. The contextual identifiers include at least one of a stage identifier identifying the one or more stages of the multiple-stage sport activity associated with the course performance submission, a competition identifier identifying a competition associated with the course performance submission, an ability level identifier identifying a user ability level associated with the course performance submission, and a distance rating identifier identifying a distance rating associated with the course performance submission. The instructions further cause the processor to access one or more additional course performance submissions from multiple users, where the additional course performance submissions share the course identifier and at least one of the contextual identifiers. The instructions further cause the processor to determine, based upon a portion of the course performance submissions received from the multiple users, an overall performance rating specific to each of the stages of the multiple-stage sport activity. The instructions further cause the processor to provide, based upon at least one of the contextual identifiers and the overall performance rating, an individualized performance goal for at least one stage of the multiple-stage sport activity.

In another aspect, the present disclosure describes a method for operating a platform to provide a virtual sport league for a multiple-stage sport activity (e.g., a triathlon virtual league). The method includes receiving, by a processor of a first computing device (e.g., server), over a network from one or more second computing devices associated with a user (e.g., a competitor, a coach of a competitor, or a league administrator), a first performance submission of a first competitor. The first performance submission includes, at least one of: a first course performance submission for a first multiple-stage sport activity participated by the first competitor (e.g., a past race) and a first training performance submission associated with a performance profile of the first competitor in which the profile corresponds to a sport activity type associated with a stage of the multiple-stage sport activity.

The method further includes accessing, by the processor of the first computing device, competition data for one or more first scheduled multiple-stage sport activities associated with the first competitor. The first scheduled multiple-stage sport activities define a part of a season within a virtual league for the first competitor.

The method further includes determining, by the processor of the first computing device, a ranking (e.g., first, second, third, last, etc.) of the first competitor among the plurality of competitors collectively forming the virtual league associated with the first competitor. The ranking is based at least in part upon an overall performance score of the first competitor with respect to overall performance scores corresponding to the plurality of competitors. The overall performance score of the first competitor is determined based in part upon an individual performance score specific to a given scheduled multiple-stage sport activity of the one or more first scheduled multiple-stage sport activities. The individual performance score is determined based on either i) a course performance submission of the first competitor for the given scheduled multiple-stage sport activity or ii) a projection of a performance result of the first competitor for the given scheduled multiple-stage sport activity.

The method further includes causing, by the processor of the first computing device, the ranking of the first competitor to be graphically displayed on the one or more second computing devices.

In some embodiments, the projection of the performance result of the first competitor for the given scheduled multiple-stage sport activity is determined by accessing, by the processor of the first computing device, second performance data of a plurality of second competitors. A subset of the second performance data of the second competitors shares a common course attribute with the first performance submission of the first competitor (e.g., same distance rating for at least one stage of the multiple-stage sport activity, same difficult rating for at least one stage of the multiple-stage sport activity). The step of determining the projection may further include determining, by the processor of the first computing device, based upon the first performance submission and a subset of the second performance data, a performance rating for the first competitor. The performance rating may be employed to determine the projection of the performance result of the first competitor with respect to a course rating associated with the given scheduled multiple-stage sport activity and may include ratings specific to each stage (or at least one stage) of the multiple-stage sport activity.

In some embodiments, the common course attribute includes a same course identifier of the multiple-stage sport activity. In some embodiments, the common course attribute includes a same distance rating for at least one stage of the multiple-stage sport activity. In some embodiments, the common course attribute includes a same difficult rating for at least one stage of the multiple-stage sport activity.

In some embodiments, the multiple-stage sport activity is a triathlon. In some embodiments, the multiple-stage sport activity includes biathlon, decathlon, heptathlon, modern pentathlon, octathlon, pentathlon, quadrathlon, tetrathlon, icosathlon, and aquathlon. In some embodiments, the stages of the multiple-stage sport activity include running, swimming, and bicycling.

In some embodiments, the method further includes causing, by the processor of the first computing device, a graphical representation of a first individual performance score and a second individual performance score to be graphically displayed on the one or more second computing devices. The first individual performance score may be based upon the course performance submission of the first competitor for the given scheduled multiple-stage sport activity. The second individual performance score may be based upon the projection of the performance result of the first competitor for the given scheduled multiple-stage sport activity. The method may further include receiving, from the one or more second computing devices, a selection between the first individual performance score and the second individual performance score. In some embodiments, the selection of the second individual performance score results in a penalty being assigned within the virtual league to the first competitor.

In some embodiments, the method further includes adjusting the individual performance score of the first competitor for the given multiple-stage sport activity, based upon a scoring compensation rate associated with the first competitor. In some embodiments, the scoring compensation rate includes a demographic attribute and/or category attribute of the first competitor. In some embodiments, the scoring compensation rate includes a performance result of the first competitor in one or more multiple-stage sport activities participated by the first competitor. In some embodiments, the scoring compensation rate includes a relative performance of the first competitor to other competitors in one or more multiple-stage sport activities participated by the first competitor. In some embodiments, the scoring compensation rate includes a relative performance of the first competitor to a top athlete in the same demographic and/or category attribute with the first competitor in one or more multiple-stage sport activities participated by the first competitor. In some embodiments, the scoring compensation rate includes training conditions associated with the first competitor (e.g., an equipment setting or physiological profile, e.g., of $O_2$ and/or $CO_2$ levels, of the competitor measured during training or an event).

In some embodiments, the method further includes adjusting the individual performance score of the first competitor for the given multiple-stage sport activity based upon a scoring compensation rate associated with the first competitor. The scoring compensation rate may be based upon a purchasable score modifier. In some embodiments, the degree of the adjustment is based upon how much money the user spends for the purchasable score modifier. In some embodiments, the method further includes causing one or more purchasable score modifiers to be graphically presented on the one or more second computing devices. The purchasable score modifiers may include a one-time use accessory and a semi-permanent use accessory. The method may further include receiving a selected purchasable score modifier of the one or more purchasable score modifiers and causing an electronic payment transaction corresponding to a purchase of the selected purchasable score modifier to be processed.

In some embodiments, the competition data for first scheduled multiple-stage sport activities include a future event date. In some embodiments, the competition data for first scheduled multiple-stage sport activities include a future event identification. In some embodiments, the competition data for first scheduled multiple-stage sport activities include a stage rating information associated with a future event. In some embodiments, a given user account of each competitor in the virtual league of the first competitor includes one or more second scheduled multiple-stage sport activities. A subset of the second scheduled multiple-stage sport activities of the other competitors in the virtual league may be different from the first scheduled multiple-stage sport activities of the first competitor.

In some embodiments, the first training performance submission includes completion time information associated with a training session. In some embodiments, the first training performance submission includes completion distance information of the training session. In some embodiments, the first training performance submission includes completion rate information of the training session. In some embodiments, the first training performance submission includes difficulty rating information associated with the training session. In some embodiments, the first training performance submission includes completion schedule information of a pre-defined set of training sessions.

In some embodiments, the first course performance submission includes completion time information for one or more stages of the multiple-stage sport activity for the first competitor, a competitor identifier identifying the first competitor, and a course identifier of the multiple-stage sport activity participated by the first competitor. The course identifier may be a name or a course characteristic in which a course identity can be ascertained. The course identifier may be determined based upon one or more members of the group consisting of: GPS location data, wireless broadcasting data, and digital location data through mobile data.

In another aspect, the present disclosure describes a system to provide a virtual sport league for a multiple-stage sport activity (e.g., a triathlon virtual league). The system include a processor and a memory having instructions stored thereon. The instructions, when executed by the processor, cause the processor to receive, over a network from one or more second computing devices associated with a user (e.g., a competitor, a coach of a competitor, or a league administrator), a first performance submission of a first competitor. The first performance submission includes, at least one of i) a first course performance submission for a first multiple-stage sport activity participated by the first competitor (e.g., a past race) and ii) a first training performance submission associated with a performance profile of the first competitor in which the profile corresponds to a sport activity type associated with a stage of the multiple-stage sport activity.

The instructions, when executed by the processor, further cause the processor to access competition data for one or more first scheduled multiple-stage sport activities associated with the first competitor. The first scheduled multiple-stage sport activities define a part of a season within a virtual league for the first competitor.

The instructions, when executed by the processor, further cause the processor to determine a ranking (e.g., first, second, third, last, etc.) of the first competitor among the competitors within the virtual league of the first competitor. The ranking is based at least in part upon an overall performance score of the first competitor with respect to overall performance scores corresponding to the plurality of competitors. The overall performance score of the first competitor is determined based in part upon an individual performance score specific to a given scheduled multiple-stage sport activity of the one or more first scheduled multiple-stage sport activities. The individual performance score is determined based on either i) a course performance submission of the first competitor for the given scheduled multiple-stage sport activity or ii) a projection of a performance result of the first competitor for the given scheduled multiple-stage sport activity.

The instructions, when executed by the processor, further cause the processor to cause the ranking of the first competitor to be graphically displayed on the one or more second computing devices.

In some embodiments, the projection of the performance result is determined by accessing, by the processor of the first computing device, second performance data of a plurality of second competitors. A subset of the second performance data of the second competitors may share a common course attribute with the first performance submission of the first competitor (e.g., same distance rating for at least one stage of the multiple-stage sport activity, same difficult rating for at least one stage of the multiple-stage sport activity). The step of determining the projection may further include determining, by the processor of the first computing device, based upon the first performance submission and a subset of the second performance data, a performance rating for the first competitor. The performance rating may be employed to determine the projection of the performance result of the first competitor with respect to a course rating associated with the given scheduled multiple-stage sport activity.

In some embodiments, the common course attribute includes a same course identifier of the multiple-stage sport activity. In some embodiments, the common course attribute includes a same distance rating for at least one stage of the multiple-stage sport activity. In some embodiments, the common course attribute includes same difficult rating for at least one stage of the multiple-stage sport activity.

In some embodiments, the multiple-stage sport activity is a triathlon. In some embodiments, the multiple-stage sport activity includes biathlon, decathlon, heptathlon, modern pentathlon, octathlon, pentathlon, quadrathlon, tetrathlon, icosathlon, and aquathlon. In some embodiments, the stages of the multiple-stage sport activity include running, swimming, and bicycling.

In some embodiments, the instructions, when executed by the processor, further cause the processor to cause a graphical representation of a first individual performance score and a second individual performance score to be graphically displayed on the one or more second computing devices. The first individual performance score may be based upon the course performance submission of the first competitor for the given scheduled multiple-stage sport activity. The second individual performance score may be based upon the projection of the performance result of the first competitor for the given scheduled multiple-stage sport activity. The instructions, when executed by the processor, further cause the processor to receive a selection between the first individual performance score and the second individual performance score. In some embodiments, the selection of the second individual performance score results in a penalty being assigned within the virtual league to the first competitor.

In some embodiments, the instructions, when executed by the processor, further cause the processor to adjust the individual performance score of the first competitor for the given multiple-stage sport activity, based upon a scoring compensation rate associated with the first competitor. In some embodiments, the scoring compensation rate includes a demographic attribute and/or category attribute of the first competitor. In some embodiments, the scoring compensation rate includes a performance result of the first competitor in one or more multiple-stage sport activities participated by the first competitor. In some embodiments, the scoring compensation rate includes relative performance information of the first competitor to other competitors in one or more multiple-stage sport activities participated by the first competitor. In some embodiments, the scoring compensation rate includes relative performance information of the first competitor to a top athlete in the same demographic and/or category attribute with the first competitor in one or more multiple-stage sport activities participated by the first competitor. In some embodiments, the scoring compensation rate includes training conditions associated with the first competitor (e.g., an equipment setting or physiological profile, e.g., of $O_2$ and/or $CO_2$ levels, of the competitor measured during training or an event).

In some embodiments, the instructions, when executed by the processor, further cause the processor to adjust the individual performance score of the first competitor for the given multiple-stage sport activity, based upon a scoring compensation rate associated with the first competitor. The scoring compensation rate may be based upon a purchasable score modifier. In some embodiments, the degree of the adjustment is based upon how much money the user spends for the purchasable score modifier. In some embodiments, instructions, when executed by the processor, further cause the processor to cause one or more purchasable score modifiers to be graphically presented on the one or more second computing devices. The purchasable score modifiers may include a one-time use accessory and a semi-permanent use accessory. The instructions, when executed by the processor, may further cause the processor to receive a selected purchasable score modifier of the presented purchasable score modifiers and to cause an electronic payment transaction corresponding to a purchase of the selected purchasable score modifier to be processed.

In some embodiments, the competition data for first scheduled multiple-stage sport activities include a future event date. In some embodiments, the competition data for first scheduled multiple-stage sport activities include a future event identification. In some embodiments, the competition data for first scheduled multiple-stage sport activities include a stage rating information associated with a future event. In some embodiments, a given user account of each competitor in the virtual league of the first competitor includes one or more second scheduled multiple-stage sport activities. In some embodiments, a subset of the second scheduled multiple-stage sport activities of the other competitors in the virtual league is different from the first scheduled multiple-stage sport activities of the first competitor.

In some embodiments, the first training performance submission includes completion time information associated with a training session. In some embodiments, the first training performance submission includes completion distance information of the training session. In some embodiments, the first training performance submission includes completion rate information of the training session. In some embodiments, the first training performance submission includes difficulty rating information associated with the training session. In some embodiments, the first training performance submission includes completion schedule information of a pre-defined set of training sessions.

In some embodiments, the first course performance submission includes: completion time information for one or more stages of the multiple-stage sport activity for the first competitor, a competitor identifier identifying the first competitor, or a course identifier of the multiple-stage sport activity participated by the first competitor. The course identifier may be determined based upon one or more members of the group consisting of: GPS location data, wireless broadcasting data, and digital location data through mobile data.

In another aspect, the present disclosure describes a method for operating a platform to provide a virtual sport league for a sport activity (e.g., a marathon virtual league). The method includes receiving, by a processor of a first computing device (e.g., server), over a network from one or more second computing devices associated with a user (e.g., a competitor, a coach of a competitor, or a league administrator), a first performance submission of a first competitor. The first performance submission includes, at least one of: a first course performance submission for a first sport activity participated by the first competitor (e.g., a past race) and a first training performance submission associated with a performance profile of the first competitor in which the profile corresponds to a sport activity type associated with the sport activity or a stage thereof.

The method further includes accessing, by the processor of the first computing device, competition data for one or more first scheduled sport activities associated with the first competitor. The first scheduled sport activities define a part of a season within a virtual league for the first competitor.

The method further includes determining, by the processor of the first computing device, a ranking (e.g., first, second, third, last, etc.) of the first competitor among the plurality of competitors collectively forming the virtual league associated with the first competitor. The ranking is based at least in part upon an overall performance score of the first competitor with respect to overall performance scores corresponding to the plurality of competitors. The overall performance score of the first competitor is determined based in part upon an individual performance score specific to a given scheduled sport activity of the one or more first scheduled sport activities. The individual performance score is determined based on either i) a course performance submission of the first competitor for the given scheduled sport activity or ii) a projection of a performance result of the first competitor for the given scheduled sport activity.

The method further includes causing, by the processor of the first computing device, the ranking of the first competitor to be graphically displayed on the one or more second computing devices.

In some embodiments, the projection of the performance result of the first competitor for the given scheduled sport activity is determined by accessing, by the processor of the first computing device, second performance data of a plurality of second competitors. A subset of the second performance data of the second competitors shares a common course attribute with the first performance submission of the first competitor (e.g., same distance rating for the sport activity, same difficult rating for the sport activity, etc.). The step of determining the projection may further include determining, by the processor of the first computing device, based upon the first performance submission and a subset of the second performance data, a performance rating for the first competitor. The performance rating may be employed to determine the projection of the performance result of the first competitor with respect to a course rating associated with the given scheduled sport activity.

In some embodiments, the common course attribute includes a same course identifier of the sport activity. In some embodiments, the common course attribute includes a same distance rating for the sport activity. In some embodiments, the common course attribute includes a same difficult rating for the sport activity.

In some embodiments, the sport activity includes marathon, swimathon, cyclothon, biathlon, triathlon, decathlon, heptathlon, modern pentathlon, octathlon, pentathlon, quadrathlon, tetrathlon, icosathlon, and aquathlon.

In some embodiments, the method further includes causing, by the processor of the first computing device, a graphical representation of a first individual performance score and a second individual performance score to be graphically displayed on the one or more second computing devices. The first individual performance score may be based upon the course performance submission of the first competitor for the given scheduled sport activity. The second individual performance score may be based upon the projection of the performance result of the first competitor for the given scheduled sport activity. The method may further include receiving, from the one or more second computing devices, a selection between the first individual performance score and the second individual performance score. In some embodiments, the selection of the second individual performance score results in a penalty being assigned within the virtual league to the first competitor.

In some embodiments, the method further includes adjusting the individual performance score of the first competitor for the given sport activity, based upon a scoring compensation rate associated with the first competitor. In some embodiments, the scoring compensation rate includes a demographic attribute and/or category attribute of the first competitor. In some embodiments, the scoring compensation rate includes a performance result of the first competitor in one or more sport activities participated by the first competitor. In some embodiments, the scoring compensation rate includes relative performance information of the first competitor to other competitors in one or more sport activities participated by the first competitor. In some embodiments, the scoring compensation rate includes relative performance information of the first competitor to a top athlete in the same demographic and/or category attribute with the first competitor in one or more sport activities participated by the first competitor. In some embodiments, the scoring compensation rate includes training conditions associated with the first competitor (e.g., an equipment setting or physiological profile, e.g., of $O_2$ and/or $CO_2$ levels, of the competitor measured during training or an event).

In some embodiments, the method further includes adjusting the individual performance score of the first competitor for the given sport activity based upon a scoring compensation rate associated with the first competitor. The scoring compensation rate may be based upon a purchasable score modifier. In some embodiments, the degree of the adjustment is based upon how much money the user spends for the purchasable score modifier. In some embodiments, the method further includes causing one or more purchasable score modifiers to be graphically presented on the one or more second computing devices. The purchasable score modifiers may include a one-time use accessory and a semi-permanent use accessory. The method may further include receiving a selected purchasable score modifier of the one or more purchasable score modifiers and causing an electronic payment transaction corresponding to a purchase of the selected purchasable score modifier to be processed.

In some embodiments, the competition data for first scheduled sport activities include a future event date. In some embodiments, the competition data for first scheduled sport activities include a future event identification. In some embodiments, the competition data for first scheduled sport activities include a stage rating information associated with a future event. In some embodiments, a given user account of each competitor in the virtual league of the first competitor includes one or more second scheduled sport activities. A subset of the second scheduled sport activities of the other competitors in the virtual league may be different from the first scheduled sport activities of the first competitor.

In some embodiments, the first training performance submission includes completion time information associated with a training session. In some embodiments, the first training performance submission includes completion distance information of the training session. In some embodiments, the first training performance submission includes completion rate information of the training session. In some embodiments, the first training performance submission includes difficulty rating information associated with the training session. In some embodiments, the first training performance submission includes completion schedule information of a pre-defined set of training sessions.

In some embodiments, the first course performance submission includes completion time information for the sport activity for the first competitor, a competitor identifier identifying the first competitor, and a course identifier of the sport activity participated by the first competitor. The course identifier may be a name or a course characteristic in which a course identity can be ascertained. The course identifier may be determined based upon one or more members of the group consisting of: GPS location data, wireless broadcasting data, and digital location data through mobile data.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
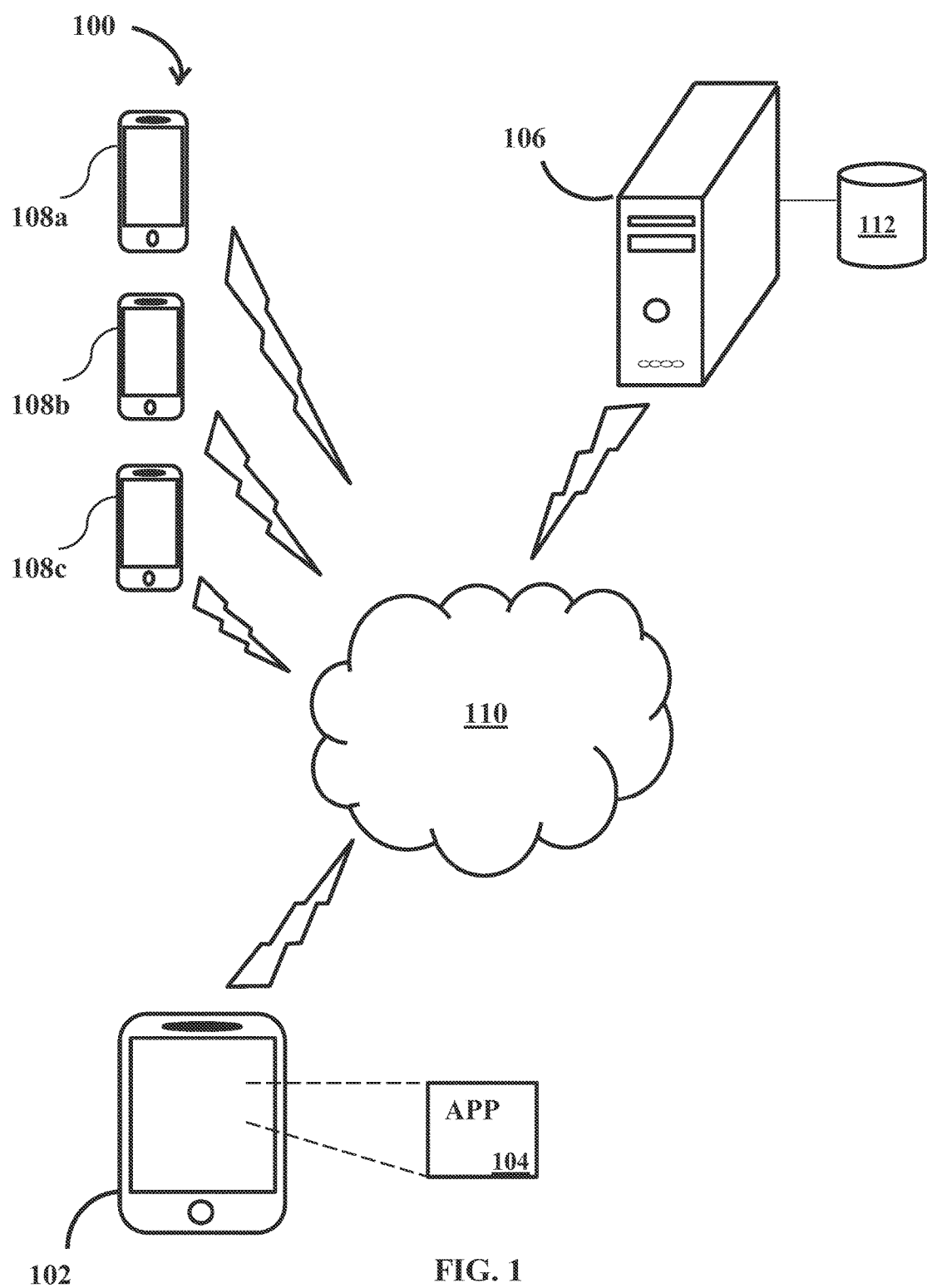
FIG. 1 is a diagram of a system for determining an individualized performance goal for a multiple-stage sport activity, according to an illustrative embodiment of the invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present disclosure presents a system, method, and computer-program product directed toward the determination and maintenance of performance ratings for particular courses and/or stages of a multiple-stage sport activity, as well as the determination of individualized goals based on those ratings and individual historical performance data. In some implementations, multiple-stage sport activities may include, but are not limited to, triathlons, duathlons, off-road triathlons and duathlons, aquathlons, biathles, aquabikes, quadrathlons, decathlons, rowathlons, winter triathlons, and quadrathlons. Examples of stages represented in multiple-stage sport activities include swimming, bicycling, running, skiing, and shooting.

The system of the present disclosure allows users to contribute to an overall performance rating that reflects, based upon historical performance data for a plurality of users, a par completion time for individual stages of the multiple-stage sport activity and for the total completion time of the multiple-stage sport activity. Based upon a user's own historical performance data and other contextual factors, the platform calculates a 'handicap' and/or an individualized performance goal for the user, according to the user's ability level and/or other factors.

FIG. 1 is a diagram of a system for determining and/or maintaining an individualized performance goal for a multiple-stage sport activity, according to an illustrative embodiment of the invention. The mobile environment 100 provides multiple users with the infrastructure to calculate an individualized performance goal. A mobile device 102 is in communication with the application server 106 via the network 110. The application server 110 includes a processor and a memory, and is configured to access a storage volume 112 to store course performance data submissions submitted by the user via his or her mobile device 102 and other users via their mobile devices 108a, 108b, and 108c (collectively, the other mobile devices 108). The mobile device 102 presents a mobile application 104, which is used, amongst other things, to create performance data submissions of the user.

The mobile device 102 may include a timer, which can be activated and deactivated by the user for each of the various stages of the multiple-stage sport activity. For example, a user who is performing a triathlon will typically perform a swimming stage, a bicycling stage, and a running stage. The user interacts with the mobile application 104 to initiate the swimming stage timer (using, for example, a large button labeled "Start Triathlon Timer"). During the transition to the bicycling stage, the user interacts with the mobile application 104 to cease the swimming stage timer and initiate a bicycling stage timer (using, for example, the same large button, relabeled by the mobile application 104 to "Start Bicycle Stage"). During the transition to the running stage, the user interacts with the mobile application 104 to cease the swimming stage timer and initiate a running stage timer (using, for example, the same large button, relabeled by the mobile application 104 to "Start Running Stage"). After completion of the running stage, the user interacts with the mobile application 104 to end the running timer and complete the triathlon (using, for example, the same large button, relabeled by the mobile application 104 to "Stop Triathlon Timer"). The mobile application 104 thus has the necessary data to determine the completion time for each of the stages of the triathlon, and further has the necessary data to determine the overall completion time for the triathlon (i.e., by summing the completion times for each of the three stages.)

In some implementations, the user does not interact with the mobile application 104 during the multiple-stage sport activity; he or she simply initiates the timer at the beginning of the activity, and ceases the timer after the completion of all stages of the activity in order to determine an overall completion time. In further implementations, the mobile device 102 is configured to transition the timer between stages of the multiple-stage sport activity using alternative methods. Some examples of alternative methods for interacting with the timer include, but are not limited to, voice activated commands, use of physical buttons on the mobile device, GPS checkpoints or local wireless checkpoints at the course transition locations, and separate devices (such as the Garmin Forerunner event computer or Samsung Galaxy Gear watch computer) configured to interact with the mobile device 102 and mobile application 104 using a wired connection (e.g., a headphone jack connection or USB connection) or a wireless connection (e.g., Wi-fi or Bluetooth). In certain implementations, the mobile device 102 further includes sensors such as an accelerometer and/or a gyroscopic sensor, and the mobile application 104 is configured to interpret the readings of the sensors to detect when a particular activity is being performed.

In some implementations, certain stages of the multiple-stage sport activity may be non-timed stages or stages including an additional scoring element not entirely dependent on completion time (e.g., a rifle marksmanship stage.) The user is further enabled to input the additional scoring information during or after the completion of the multiple-stage sport activity.

After completion of a multiple-stage sport activity, the course performance information is sent by the mobile application 104 to the application server 106. The application server 106 is configured to store the performance data on the storage volume 112 so that it can be used to suggest an individualized performance goal for future multiple-stage sport activities and/or competitions. In some implementations, the performance data is also stored on the mobile device 102.

Figure 2:
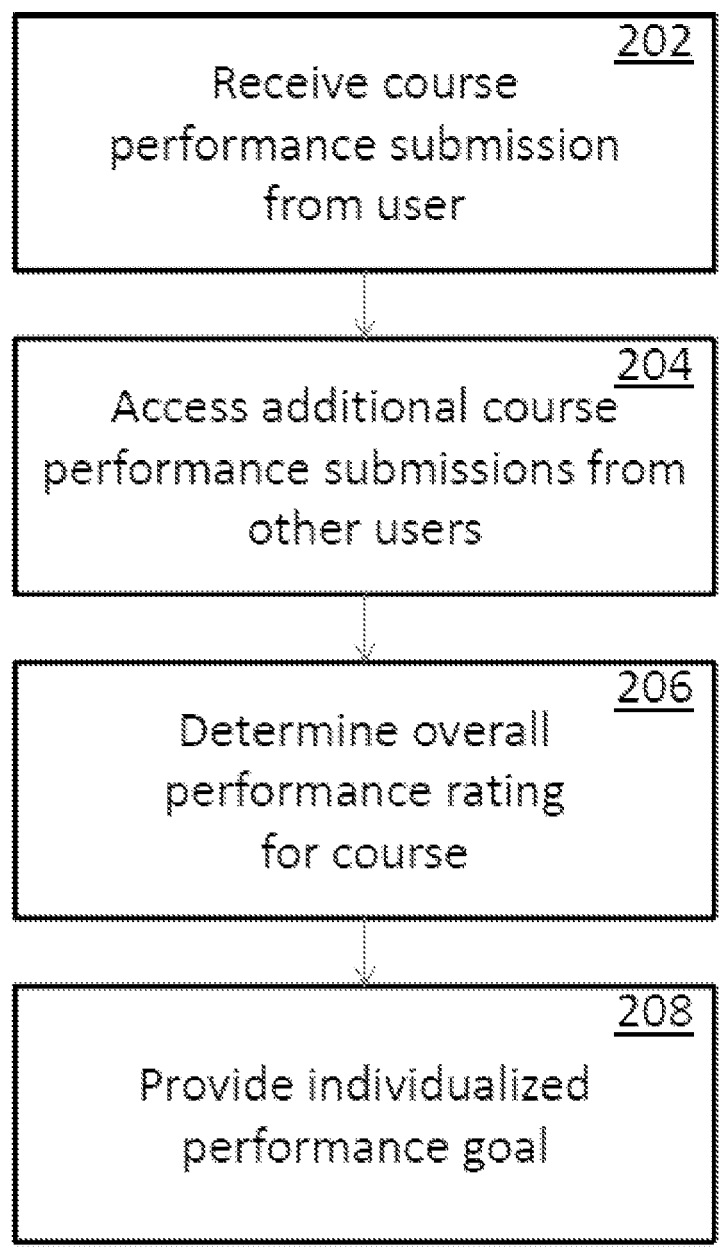
FIG. 2 is a block diagram illustrating a method of providing an individualized performance goal for a multiple-stage sport activity, according to an illustrative embodiment of the invention.

FIG. 2 is a block diagram illustrating a method of providing an individualized performance goal for a multiple-stage sport activity, according to an illustrative embodiment of the invention. The application server 106 receives, over a network, a course performance submission from the user of a mobile device 102 [202]. The course performance submission includes a variety of data that can be used to determine an overall performance rating and an individualized performance goal for the user. The course performance submission includes the completion time and any additional scoring associated with each of the one or more stages of the multiple-stage sport activity that the user has completed.

In one implementation, the user completes an entire multiple-stage sport activity (such as a triathlon), and the course performance submission includes completion time data for each of the stages (e.g., 120 minutes for the swimming stage, 480 minutes for the bicycling stage, and 360 minutes for the running stage) and the total completion time for the multiple-stage sport activity (e.g., 960 minutes total time for the triathlon). In some implementations, the course performance submission may further include additional scoring data for certain stages of the multiple-stage sport activity that are non-timed stages or stages that include an additional scoring element not entirely dependent on the completion time (e.g., 18 hits out of 24 attempts for a rifle marksmanship stage.)

The user may also choose not to complete the entire multiple-stage sport activity, and the course performance submission will include only the completion time or scoring for the particular stages that the user has completed. For example, a user training for an Ironman Triathlon competition may wish to specifically work on the bicycling stage in order to improve his or her performance on that particular stage. The user is enabled to submit only the completion time for the bicycling stage for use in the determination of an individualized performance goal for the bicycling stage.

Each course performance submission includes a user identifier (also referred to as a competitor identifier) linking the course performance submission to a unique user/competitor. The application server 106 stores the course performance submission on storage volume 112, enabling the application server 106 to access historical course performance data when determining the individualized performance goal for the unique user.

Each course performance submission includes a course identifier linking the course performance submission to a particular course (such as the Ironman Arizona triathlon course in Tempe, Ariz. and the Ironman Mallorca triathlon course in Mallorca, Spain). The course identifier is used by the application server to determine an overall performance rating for the particular course, by analyzing a plurality of course performance submissions linked by the particular course identifier. The resultant overall performance rating is used by the application server to determine the individualized performance goal for a unique user on the particular course. In some implementations, the course identifier is tied to a location. In further implementations, the course identifier is determined using the GPS capabilities of the mobile device 102.

The course performance submission further includes at least one contextual identifier, which is used by the application server to determine an overall performance rating or individualized performance goal. Examples of contextual identifiers include, but are not limited to, a stage identifier identifying the one or more stages of the multiple-stage sport activity associated with the course performance submission (e.g., the swimming stage, the bicycle stage, the running stage, or combinations thereof), a competition identifier identifying a competition associated with the course performance submission (e.g., the Ironman Mallorca competition in Mallorca, Spain or the Ironman 70.3 Boulder competition in Boulder, Colo.), an ability level identifier identifying a user ability level associated with the course performance submission (e.g., a high or low ability level relative to other users), and a distance rating identifier identifying a distance rating associated with the course performance submission (e.g., a full Ironman triathlon, a half Ironman triathlon, or an Ironkids triathlon).

In certain implementations, the ability level identifier is determined based on a user's relative performance level compared to other users. For example, the application server 106 may analyze all of the course performance submissions corresponding to the Ironman Mallorca triathlon course identifier to determine the average course completion time for each of the one or more stages of the course. Users who perform the triathlon in a time less than the average course completion time may be categorized as high performance ability level, and users who exceed the average course completion time may be categorized as low performance ability level. In some implementations, users are assigned an ability level by the application server at a higher granularity, up to and including individual ranking of performance level (e.g., the 54th highest ability level out of 2,500 unique users at the particular course). In further implementations, users are assigned an ability level independent of a particular course (e.g., an 80th percentile ability level worldwide). In other implementations, an overall ability level coefficient is determined for each stage of the multiple-stage sport activity. For example, for a triathlon, a three value coefficient may be determined representing performance ability on each stage of the activity (e.g., a coefficient value of (0.8, 0.5, 0.7) corresponds to how well the user performs on swimming, bicycling, and running, respectively).

After receiving a course performance submission, the application server 106 accesses a plurality of additional performance submissions that share at least one contextual identifier [204]. For example, when a user submits a course performance submission corresponding to the bicycle stage of a triathlon, the application server is configured to analyze only those submissions from users who have also completed the bicycle stage of the triathlon. The applications server may consider those submissions where the bicycle stage was completed exclusively, or may further consider submissions where the bicycle stage was completed in combination with other stages.

In another example, when a user submits a course performance submission corresponding to a particular competition, the application server may analyze only those submissions by users who were also competing in the exact same competition, or those submissions by users who were competing in the same competition or a previous iteration of the competition. Such an analysis is useful for determining an overall performance rating for when the plurality of users are competing "at their best" as opposed to the more general data obtained when users are training for the competition.

In some implementations, users are enabled to configure which identifiers will be used for the analysis and determination of the overall performance rating and individualized performance goal. For example, users may wish to determine an overall performance goal based only upon other users at an ability level within a threshold distance from their own ability level. In another example, a user may wish to determine an individualized performance goal that is based only upon those submissions where the user completed the bicycle stage of a triathlon exclusively.

After accessing the plurality of course performance submissions corresponding to one or more contextual identifiers, the application server determines an overall performance rating for each particular stage of the multiple-stage sport activity [206]. In some implementations, the application server further limits its analysis to a subset of course performance submissions, such as a competition identifier. In certain implementations, the application server analyzes all submissions corresponding to a particular course identifier and one or more contextual identifiers. In other implementations, the application server only considers a single submission per analysis for each unique user (such as the best submission), or the average all of the submissions received from a unique user.

The overall performance rating indicates a course performance that, in general, represents a successful course completion (similar to achieving a "par" score in Golf). In some implementations, the application server calculates an average course completion time based upon the course identifier and one or more contextual identifiers, and uses the average as the overall course rating. Thus, the course performance rating corresponds to the completion time of an average user. In other implementations, the course performance rating is calculated based upon only a subset of performance submissions. For example, the application server may analyze only those submissions by users in the 75th percentile of course completion times when determining the course performance rating. An overall performance rating is determined for each of the stages of the multiple-stage sport activity and for the complete multiple-stage sport activity. In some implementations, a course performance rating is represented by a coefficient that indicates how difficult a course is compared to other courses for each stage of the activity (e.g., for a triathlon, a course performance rating coefficient of (0.8, 1.3, 0.9) indicates the relative difficult of the course compared to other triathlon courses for each of swimming, biking, and running, respectively). In certain implementations, the course performance rating is based upon the rate of progress during the performance (e.g., a course performance rating corresponding to swimming at 100 m/s).

The application server is further enabled to provide, based upon at least one of the contextual identifiers, an individualized performance goal for one or more stages of the multiple-stage sport activity [208]. Users vary in their relative ability level, and an overall performance rating which is ideal for a particular user may be too easy or too hard to achieve for another user. The individualized performance goal takes into account at least one historical data point for the unique user and the overall performance rating. Based on the user's ability level, the individualized performance goal presents a goal that should be achievable for the user but still instills satisfaction in the user when it is achieved. In a preferred embodiment, the application server deducts (or adds) a time modification value to the overall performance rating of the course. For example, a high ability level user on a 960 minute overall performance rating course may be given a 40 minute deduction, resulting in an individualized performance goal of 920 minutes. If the user achieves or exceeds the goal, he or she may consider himself or herself to have successfully completed the course (similar to applying a golf handicap to an overall score after a round of golf). In further implementations, the individualized performance goal serves as a predictor of expected performance based on the historical data associated with a unique user and his or her prior performance submissions. In certain implementations, the historical data and corresponding contextual identifiers enable the application server to offer a prediction of course performance on courses that the user has never previously completed.

In some implementations, the individualized performance goal and/or overall performance rating may further utilize the distance identifier to enabled users to compare multiple-stage sport activities of the same type (e.g., triathlon) which, though of different distances, can still be useful to predict performance and establish goals. For example, a user who performs a half Ironman course may be able to get a useful prediction for his or her performance on a full Ironman course.

Virtual League

In certain implementations, the historical data, performance statistics, and performance predictions corresponding to multiple unique users are consolidated into a sport activity virtual league. In certain embodiments, the sport activity includes two or more stages. In certain embodiments, a subset of the stages of the multiple-stage sport activity include sporting category event types of different types. In certain embodiments, the sport activity is a relay race or a marathon sport. In further implementations, the virtual league is administered on a virtual league platform, such as a computer server. In one implementation, the virtual league platform is the application server 106. In another implementation, the virtual league platform includes web servers or one or more servers that provide web services. The virtual league platform is enabled to calculate and provide results projections, ranking of athletes, and an event calendar to members of the virtual league. In some implementations, the event calendar corresponds to an event schedule and/or calendar based at least in part upon the event schedule of an administrative body that organizes, promotes, and/or licenses a multiple-stage sport activity (e.g., The World Triathlon Corporation of Tampa, Fla.). Users are enrolled in a virtual league with other users. In certain implementations, users join a virtual league that includes users that they know or have competed with. In other implementations, a user may join a league with users who he or she is not familiar with.

In some embodiments, the platform assigns users to (or the user can request or register with) one or more groups or communities that are linked with a related sport or multiple-sport club or organization. In some embodiments, the association is based on social network connection associated with the user. For example, the platform can automatically create communities/groups based on the "Friends" network of the user. In other embodiments, each user elects and/or selects his or her group/community. In some embodiments, a user has to be nominated and/or invited by another user into a given group or community. In some embodiments, the users can set up a group or community to which the user can request other users to join or other users can request to join. In certain embodiments, the user (for example, referred to as "BPeople") has a profile within the platform. The profile can be linked to groups or communities of sport and/or multiple-sport clubs or organizations.

Users can join particular virtual leagues associated with the sport or multiple-stage sport activity they are interested in competing in. After performing a threshold number of physical events, the user is assigned one or more handicaps by the virtual league platform reflective of the user's performance in comparison, for example, with the other members of the virtual league. In certain embodiments, the threshold number is at least one. The handicap can be determined based on any given factors, for example, but not limited to, an attribute of the user (e.g., the user's demographics and/or category), a historic performance of the user (e.g., past standing and/or results), a relative performance of the user to other users, a relative performance of the user to the top athlete(s) in the demographic and/or category of the user, and training conditions associated with the user (e.g., the user's resistance coefficient or $CO_2$ profile during training/racing), among others. In certain embodiments, the virtual league platform accesses performance data associated with the user to assign a handicap, including performance coefficients and/or projected results based on historical performance.

In some implementations, the virtual leagues is based on, for example, but not limited to, local, state, and/or international competition (e.g., Sprint Triathlon, the Olympics, the Half Ironman Triathlon, and the Ironman Triathlon). In other implementations, the virtual leagues may also be based on marathons, swimathons, and cyclothons.

In certain embodiments, distance, difficulty, and rating for a given course can be varied from their normal/official rating and specification. In certain embodiments, the courses are based on real or fictional places.

In certain embodiments, the user accesses the various functions and features of the virtual league by using the mobile application 104, including but not limited to event schedule, outcome predictions (e.g., rankings), and performance predictions (e.g., completion time). The user is further enabled to access historical performance rankings and ratings corresponding to the events in the virtual league, including but not limited to, the date and time of previous events, weather conditions of previous events, actual outcome of the events (e.g., raw rankings), handicapped outcomes of the events (e.g., league rankings), and performance information for the league members that participated in the event.

The user accesses the mobile application 104 to identify upcoming events on the event schedule in which the user is expected to compete. A user may identify upcoming events that the user will not be able to compete in (e.g., due to scheduling conflicts, injury, difficulty, distance, etc.). The mobile application 104 displays to the user a performance prediction calculated based on historical data associated with the user. In certain implementations, the historical data include performance coefficients. The historical data are employed, in certain embodiments, to determine a projection result, which is compared to the projection results of other users in the league. In some embodiments, the projection results is used to determine rankings of the competitors in the league.

In some embodiments, the user may complete a physical competition scheduled in the user's virtual league calendar. The result from the competition is a part of the submission to the platform and is used to determine the ranking of the user within the league. In some embodiments, the user may choose to accept, in lieu of physical competition, the performance prediction calculated by the virtual league platform as a virtual event result. In certain implementations, the selection may be a passive selection (i.e., the virtual league platform will use the virtual event result if there is no physical event result submitted for a particular event). The virtual event result is used by the virtual league platform to calculate the user's event performance for the virtual league. For virtual league ranking purposes, the virtual event result is counted as equivalent to a physical event result. In some implementations, if the user performs worse than anticipated by the virtual league performance predictions, the user may choose to submit the virtual event results instead of the obtained physical event results. In further embodiments, official event results are collected by the virtual league platform and need not be submitted by the users.

In some embodiments, the platform calculates a virtual score following a scheduled sport event. A virtual score for the user may be calculated for each event and then aggregated to determine an overall score for the user. In certain embodiments, an individual score of a user is compared against those of other users in the league following a given event, and a tiered score s assigned for that event. The scores (tiered or non-tiered) are aggregated to determine the ranking of the users in the league (e.g., on an on-going basis). In other embodiments, the scores are aggregated and compared at the end of the season to determine the ranking of the user.

In certain implementations, the platform updates the performance and/or outcome prediction of a given user when new data is received from the user. In some embodiments, once a user registers and/or signs in to the platform, the platform prompts the user for historical race results and training data. In some embodiments, the platform presents the historical races and/or historical race results that the user can select. In some embodiments, the historical races and/or historical race results are retrieved from the race-results database. For example, when a user signs in with his or her USAT profile information (USA Triathlon profile), the data from the official USAT profile is linked to the user's profile. The platform may present to the user the race results, including for example the names and registration numbers of the participants. In some embodiments, the platform presents potential names and results matched to the user's identifier. The user can confirm or select the presented name and/or results. In some embodiments, once the platform receives data from the user, the platform automatically starts the prediction analysis of that user. As the user adds training schedule and future races, the platform re-calculates and/or updates the prediction analysis for the users.

In other implementations, the platform periodically updates the performance and/or outcome prediction of the given user. The updates may be performed, for example, on an hourly, daily, or weekly basis.

In certain implementations, submitting a virtual-event result may incur some penalty, such as a virtual event result identifier or other non-competition penalty (e.g., a time penalty), that encourages users to submit the results of physical events instead of using virtual event results in the league. In certain implementations, the non-competition penalty may increase in severity and/or magnitude as further virtual event results are submitted. In further implementations, the non-competition penalty may be a monetary penalty or virtual currency penalty. In some implementations, each user controls a cache of virtual league points (point cache). In one implementation, the non-competition penalty is a deduction of virtual league points from the users point cache. The user may attain virtual league points by various methods including but not limited to participating in certain events and/or promotions and buying points from the administrator of the virtual league platform.

When a user elects to submit a virtual event result, the user is prompted with a notification that a quantity of points will be deducted from the user's point cache. If the user controls the requisite amount of points, the user's virtual event result will be used for calculating league standings. In some implementations, a user may submit virtual results for events he or she has not participated in without a point deduction, but will have points deducted if substituting a virtual event result for a physical event result. If the user does not control the requisite amount of points, the user will be prompted to add a number of points to his or her point cache. The user will then be directed to an interface where he or she can add the necessary amount of points by, for example, purchasing the required amount of points, purchasing a block of points (e.g., a 10 point block, a 100 point block, or a 1000 point block), or some other method of adding points to the point cache.

As users finalize their performances corresponding to a particular event, the virtual league platform adjusts future performance predictions based on changes in the performance data of the users. At the completion of the league schedule, ranking are calculated. In some implementations, the administrator of the virtual league platform distributes prizes to top performers in the league (e.g., best male competitor, best female competitor, best juvenile female competitor, best in a given demographic category, best in a given performance level, best in a given category of training conditions associated with the competitors, etc.) In further implementations, in the case of a draw for any prize, the virtual league platform offers a series of a virtual and/or physical events to decide on the final league rankings.

In certain implementations, event credits are required to participate in the events of the virtual league. Users are required to compete in at least one physical event on the league schedule each season (and, e.g., provide submission of performance and/or ranking of the race). In some implementations, after competing in a physical event, a user is awarded one or more event credits. Participating in events will require the user to spend one or more event credits. In further implementations, in lieu of participating in physical races, users may purchase event credits by deducting points from their point caches or directly from the virtual league platform administrator. In one implementation, users only earn event credits by deducting points from their point caches or directly purchasing event credits from the virtual league platform administrator.

In some implementations, users that desire to submit virtual race results can utilize virtual event credits in lieu of physical competition or to replace the results of physical competition. In one implementation, if a user wishes to improve their standing in an event, they may spend virtual event credits to improve their performance. The user can exchange points from his or her point caches to select a predicted result rather than an actual result for a given scheduled event. The platform may provide a time limit following the event to make such elections (e.g., within a set time period, before the next scheduled event of the user, or before the next scheduled event of other competitors in the same league).

In another implementation, users may improve their performance in the virtual league by acquiring virtual accessories (e.g., virtual clothing, virtual shoes, virtual refreshments, etc.). In some embodiments, users can exchange points from their point caches for virtual accessories. Accessories may either be one-time use accessories (e.g., water bottles, snacks, sports drinks, etc.) or semi-permanent accessories (e.g., running shoes, ski poles, improved clothing, etc.) that are retained for multiple events in the virtual league. In a further implementation, base accessories are included for each user in a virtual league. A user may improve the base accessories by exchanging points from the point cache for accessory upgrades (e.g., water-wicking fabrics, alternative shoe designs, etc.). In some embodiments, the user can receive semi-permanent accessories and one-time-use accessories from sponsors (e.g., for participating and/or competing in a real or virtual event). In certain embodiments, the user can receive semi-permanent virtual accessories and one-time-use virtual accessories from a purchase of the non-virtual counterpart of the given accessory.

Figure 3:
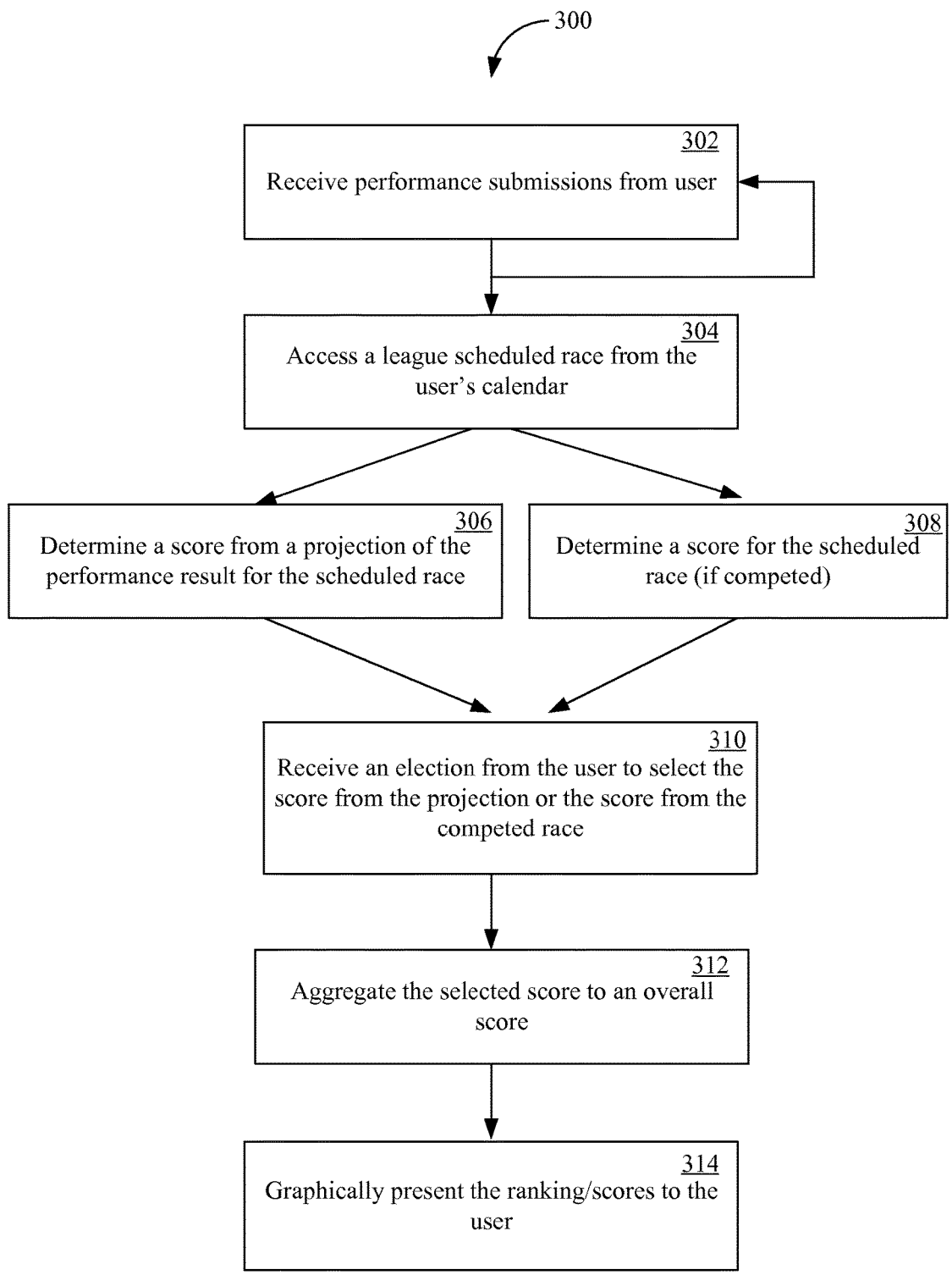
FIG. 3 is a block diagram illustrating a method of operating a platform to provide a virtual sport league for a multiple-stage sport activity, according to an illustrative embodiment of the invention.

FIG. 3 is a block diagram illustrating a method 300 of operating a platform to provide a virtual sport league for a multiple-stage sport activity, according to an illustrative embodiment of the invention. The method includes receiving, by a processor of an application server 106, over a network 110 from computing device 102 associated with the user, a first performance submission [302]. The first performance submission includes, at least one of: a course performance submission and a training performance submission. In certain embodiments, both types of submissions are employed.

The course performance submission include performance results (e.g., completion time or standing) in an actual race or event in which the use has competed. The training performance submission includes training results (e.g., completion time for a running, bicycling, or swimming training session; difficulty rating associated with the training session; duration of the training session, etc.). The performance submissions, in some embodiments, are aggregated to determine a performance rating for the user for each type of sport activity in the multiple-stage sport activity. The performance rating may be represented as an ability level coefficient, as described in relation to FIG. 2.

The method 300 then includes accessing competition data for one or more first scheduled sport activities associated with the first competitor. The first scheduled sport activities define a part of a season within a virtual league for the first competitor. Put plainly, a given season of the virtual league for a given competitor includes a series of competitions to which a competitor can earn scores within the league. A scheduled multiple-stage sport activity may include an identifier for a league competition, for example, a future event date or name, as well as difficulty and/or an ability rating of the league competition. The scheduled sport activity may include an event scheduled in the user's event calendar. The competition data may be stored in the storage volume 112.

The league, in some embodiments, may be form of sport activity and/or multiple-stage sport activity of different types. For example, competitions in the league may be formed of combinations of marathon, swimathon, cyclothon, biathlon, triathlon, decathlon, heptathlon, modern pentathlon, octathlon, pentathlon, quadrathlon, tetrathlon, icosathlon, and aquathlon.

The method 300 then includes determining a ranking (e.g., first, second, third, last, etc.) of the first competitor among the plurality of competitors collectively forming the virtual league associated with the first competitor. The ranking is based at least in part upon an overall performance score of the first competitor with respect to one or more overall performance scores corresponding to the plurality of competitors. Individual scores for each competition within the event calendar of the user are calculated and aggregated to determine the overall score.

In some embodiments, an individual score for a league competition is determined based on an event that the user has completed [308]. In addition, a virtual score is also determined for the league competition in which the score is based on a projection determined from the user's the training profile and past race results [306]. The user can use the projection to gauge the efficacy of his or her training and, in certain instances, make adjustments the training regimen.

In some embodiments, the projection is determined based on performance data of competitions sharing some commonality with the submission of the user. The projection may be determined using the process described in relation to FIG. 2. The data are associated with a pool of competitors that, for example, the user has competed against (e.g., in the same race) or in a different race on the same course or similar course with similar difficulty ratings.

In some embodiments, the individual scores derived from a completion of a league competition and from the projection are presented to the user [310]. The platform may receive a selection, from the user, among the presented individual scores to use for the overall scoring. The score derived from the actual competition may be set as the default score. Following a race, the platform may present the option of selecting the individual score from the projection, if higher, to the user. The user may be penalized for selecting the projection score over the real score or may have to pay for the election. In some embodiments, following a league competition (or election of a scoring choice), the individual score for the league competition is aggregated with user's overall score in the league [312].

The overall score in the league, individual score for each competition, overall ranking in the league, and individual ranking from each competition may be presented to the user [314]. The user can access the rankings via the mobile application 104. The ranking information (i.e., overall score, individual score, and/or standing in the virtual league) is updated, in some embodiments, when new data is received from the user. In some embodiments, the information is updated on a periodic basis. In some embodiments, the information is updated following a scheduled event in the user's race/event calendar and/or other user's race/event calendar.

Figure 4:
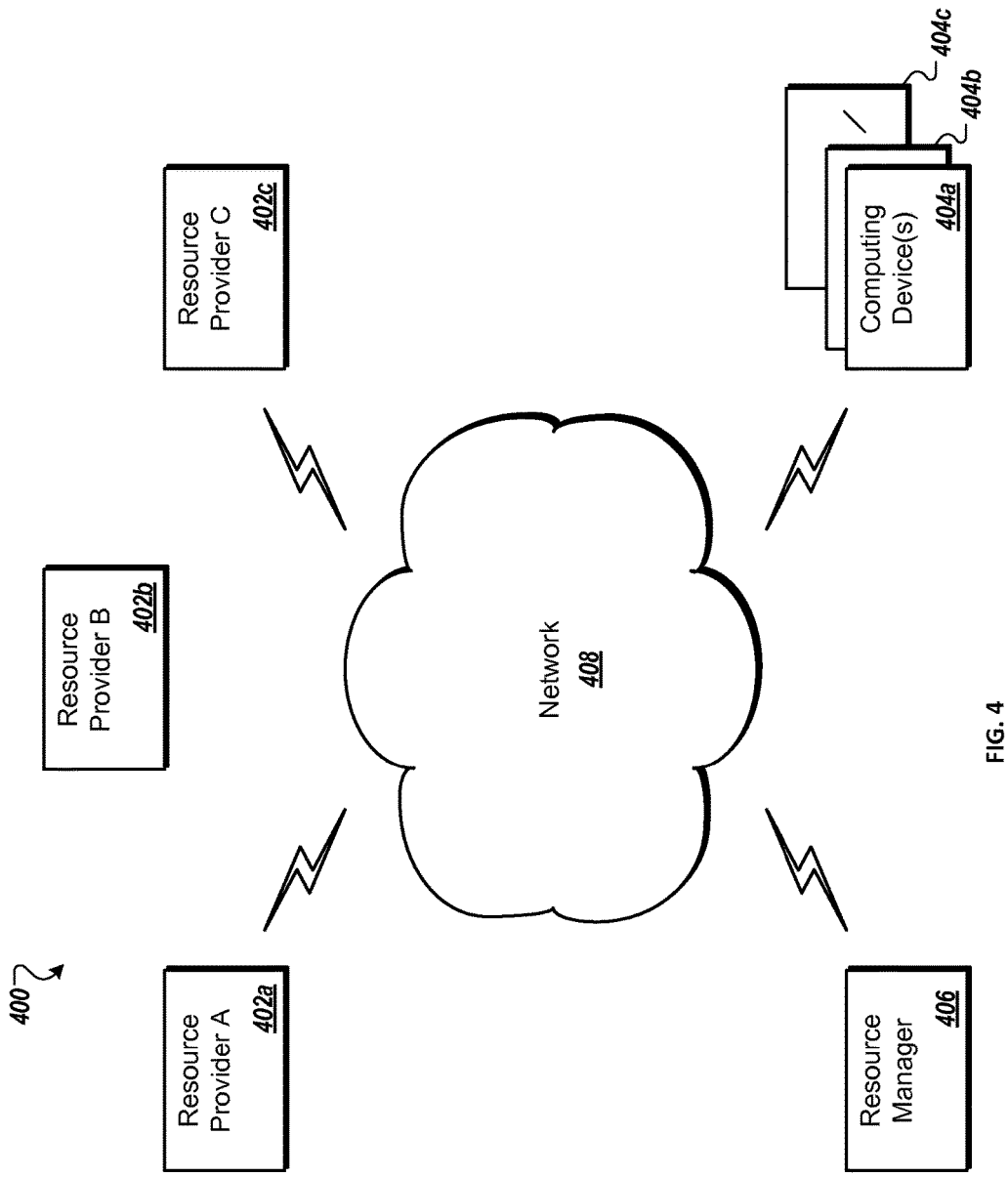
FIG. 4 is a block diagram of an example network environment, according to an illustrative embodiment.

In brief overview, referring now to FIG. 4, a block diagram of an exemplary cloud computing environment 400 is shown and described. The cloud computing environment 400 may include one or more resource providers 402a, 402b, 402c (collectively, 402). Each resource provider 402 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 402 may be connected to any other resource provider 402 in the cloud computing environment 400. In some implementations, the resource providers 402 may be connected over a computer network 408. Each resource provider 402 may be connected to one or more computing device 404a, 404b, 404c (collectively, 404), over the computer network 408.

The cloud computing environment 400 may include a resource manager 406. The resource manager 406 may be connected to the resource providers 402 and the computing devices 404 over the computer network 408. In some implementations, the resource manager 406 may facilitate the provision of computing resources by one or more resource providers 402 to one or more computing devices 404. The resource manager 406 may receive a request for a computing resource from a particular computing device 404. The resource manager 406 may identify one or more resource providers 402 capable of providing the computing resource requested by the computing device 404. The resource manager 406 may select a resource provider 402 to provide the computing resource. The resource manager 406 may facilitate a connection between the resource provider 402 and a particular computing device 404. In some implementations, the resource manager 406 may establish a connection between a particular resource provider 402 and a particular computing device 404. In some implementations, the resource manager 406 may redirect a particular computing device 404 to a particular resource provider 402 with the requested computing resource.

Figure 5:
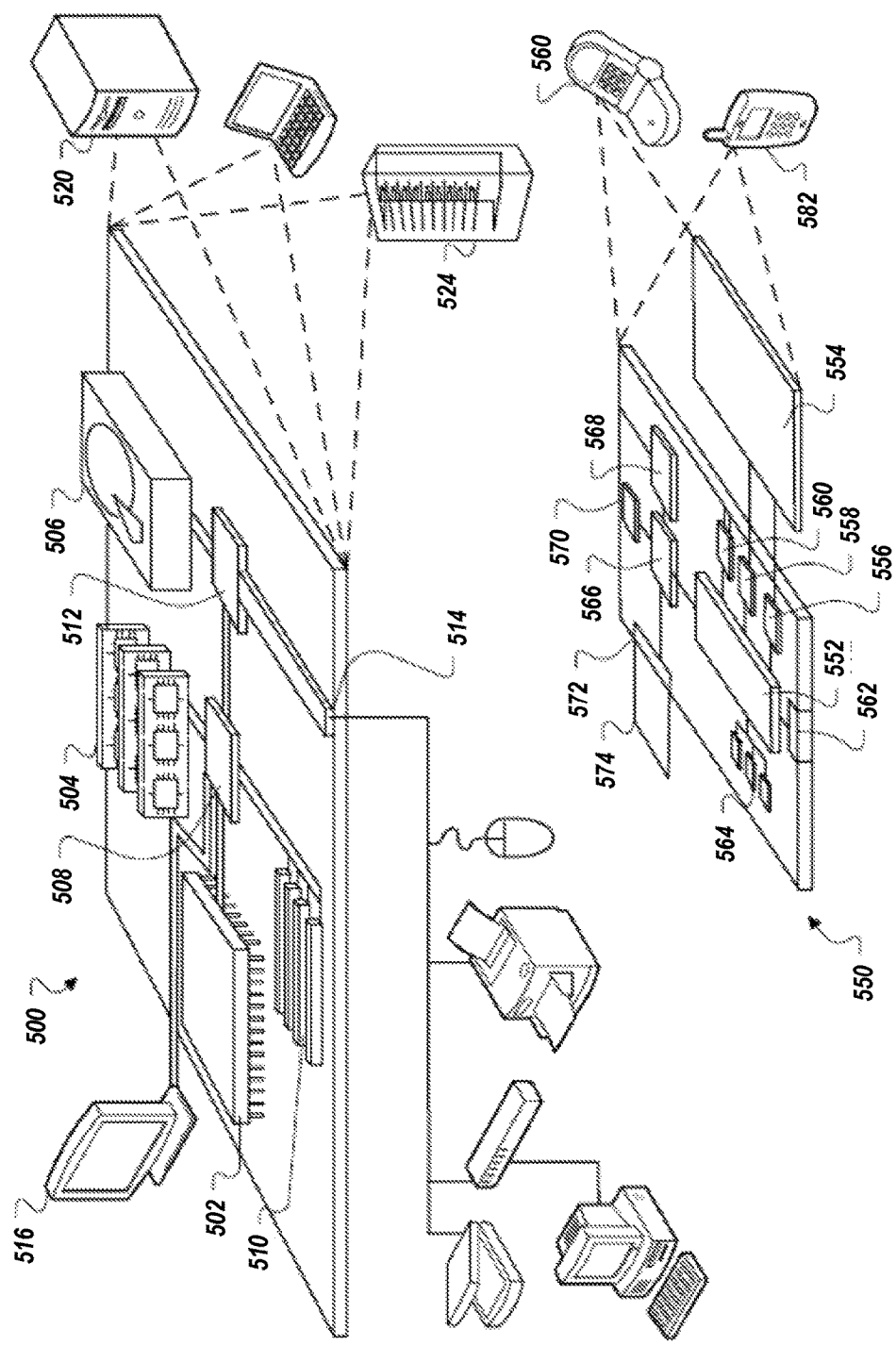
FIG. 5 is a block diagram of an example computing device and an example mobile computing device, for use in illustrative embodiments of the invention.

FIG. 5 shows an example of a computing device 500 and a mobile computing device 550 that can be used in the methods and systems described in this disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) or DIMM (Dual In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM/DIMMcards, along with additional information, such as placing identifying information on the SIMM/DIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth®, Wi-Fi™, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for operating a platform to provide a virtual sport league for a multiple-stage sport activity, the multiple-stage sport activity comprising two or more stages, wherein at least one stage of the two or more stages of the multiple-stage sport activity comprises one of a plurality of different sporting category event types, the method comprising:
    receiving, by a processor of a first computing device, over a network from one or more second computing devices associated with a user, a first performance submission of a first competitor, wherein at least a subset of the first performance submission is electronically captured by a mobile device associated with the user, as the user participates in the multiple-stage sport activity, and is transmitted from a mobile device to the first computing device;
        wherein the first performance submission comprises, at least one of:
            a first course performance submission for a first sport activity participated by the first competitor and
            a first training performance submission associated with a performance profile of the first competitor in which the profile corresponds to a sport activity type associated with a stage of the multiple-stage sport activity;
    accessing, by the processor of the first computing device, competition data for one or more first scheduled multiple-stage sport activities associated with the first competitor,
        wherein the one or more first scheduled multiple-stage sport activities define a part of a season within a virtual league for the first competitor;
    determining, by the processor of the first computing device, a ranking of the first competitor among the plurality of competitors collectively forming the virtual league associated with the first competitor,
        wherein the ranking is based at least in part upon an overall performance score of the first competitor with respect to one or more overall performance scores corresponding to the plurality of competitors, and
        wherein the overall performance score of the first competitor is determined based in part upon an individual performance score specific to one of the one or more first scheduled multiple-stage sport activities, wherein the individual performance score is determined based on either i) a course performance submission of the first competitor for the one of the one or more first scheduled multiple-stage sport activities or ii) a projection of a performance result of the first competitor for the one of the one or more first scheduled multiple-stage sport activities; and
    causing, by the processor of the first computing device, the ranking of the first competitor to be graphically displayed on the one or more second computing devices.

2. The method of claim 1, wherein the projection of the performance result of the first competitor for the one of the one or more first scheduled multiple-stage sport activities is determined by:
    accessing, by the processor of the first computing device, second performance data of a plurality of second competitors, wherein a subset of the second performance data of the second competitors shares a common course attribute with the first performance submission of the first competitor; and
    determining, by the processor of the first computing device, based upon the first performance submission and a subset of the second performance data, a performance rating for the first competitor, wherein the performance rating comprises one or more ratings specific to each stage of the multiple-stage sport activity, the performance rating being employed to determine the projection of the performance result of the first competitor with respect to a course rating associated with the one of the one or more first scheduled multiple-stage sport activities.

3. The method of claim 2, wherein the common course attribute comprises a member selected from the group consisting of:
    a same course identifier of the multiple-stage sport activity;
    a same distance rating for at least one stage of the multiple-stage sport activity; and
    a same difficulty rating for at least one stage of the multiple-stage sport activity.

4. The method of claim 1, wherein the multiple-stage sport activity is a triathlon.

5. The method of claim 1, wherein the multiple-stage sport activity is a member selected from the group consisting of biathlon, decathlon, heptathlon, modern pentathlon, octathlon, pentathlon, quadrathlon, tetrathlon, icosathlon, and aquathlon.

6. The method of claim 1, wherein the two or more stages of the multiple-stage sport activity comprise running, swimming, and bicycling.

7. The method of claim 1, comprising:
    causing, by the processor of the first computing device, a graphical representation of a first individual performance score and a second individual performance score to be graphically displayed on the one or more second computing devices, wherein the first individual performance score is based upon the course performance submission of the first competitor for the one of the one or more first scheduled multiple-stage sport, and wherein the second individual performance score is based upon the projection of the performance result of the first competitor for the one of the one or more first scheduled multiple-stage sport activities; and
    receiving, from the one or more second computing devices, a selection between the first individual performance score and the second individual performance score.

8. The method of claim 7, wherein the selection of the second individual performance score results in a penalty being assigned within the virtual league to the first competitor.

9. The method of claim 1, comprising:
adjusting the individual performance score of the first competitor for the one of the one or more first multiple-stage sport activities, based upon a scoring compensation rate associated with the first competitor,
wherein the scoring compensation rate is based upon at least one member selected from the group consisting of:
i) a demographic attribute and/or categorical attribute of the first competitor,
ii) a performance result of the first competitor in the one or more multiple-stage sport activities participated by the first competitor,
iii) a relative performance of the first competitor to other competitors in the one or more multiple-stage sport activities participated by the first competitor,
iv) a relative performance of the first competitor to a top athlete in the same demographic and/or category attribute with the first competitor in the one or more multiple-stage sport activities participated by the first competitor, and
v) training conditions associated with the first competitor.

10. The method of claim 1, comprising:
adjusting the individual performance score of the first competitor for the one of the one or more first multiple-stage sport activities based upon a scoring compensation rate associated with the first competitor, wherein the scoring compensation rate is based upon a purchasable score modifier, and wherein the degree of the adjustment is based upon how much money the user spends for the purchasable score modifier.

11. The method of claim 1, comprising:
causing one or more purchasable score modifiers to be graphically presented on the one or more second computing devices, wherein the purchasable score modifiers comprise a member selected from the group consisting of: i) a one-time use accessory and ii) a semi-permanent use accessory;
receiving, from the one or more second computing devices, a selected purchasable score modifier of the one or more purchasable score modifiers; and
causing an electronic payment transaction corresponding to a purchase of the selected purchasable score modifier to be processed, the transaction corresponding to a user account associated with the user of the one or more second computing devices.

12. The method of claim 1, wherein the competition data for the one or more first scheduled multiple-stage sport activities comprises a member selected from the group consisting of:
a future event date;
a future event identification; and
a stage rating information associated with the future event.

13. The method of claim 1, wherein a given user account of each competitor of the plurality of competitors membered to the virtual league of the first competitor includes one or more second scheduled multiple-stage sport activities, wherein a subset of the one or more second scheduled multiple-stage sport activities of a given competitor in the virtual league of the first competitor is different from the one or more first scheduled multiple-stage sport activities of the first competitor.

14. The method of claim 1, wherein the first training performance submission comprises a member selected from the group consisting of:
completion time information associated with a training session;
completion distance information of a training session;
completion rate information of the training session;
difficulty rating information associated with a training session; and
completion schedule information of a pre-defined set of training sessions.

15. The method of claim 14, wherein the first course performance submission comprises:
completion time information for one or more stages of the multiple-stage sport activity for the first competitor;
a competitor identifier identifying the first competitor; and
a course identifier of the multiple-stage sport activity participated by the first competitor.

16. The method of claim 15, wherein the course identifier is determined based upon one or more members of the group consisting of: GPS location data, wireless broadcasting data, and digital location data through mobile data.

17. A system comprising:
a processor of a first computing device; and
a memory device having instructions stored thereon, wherein the instructions, when executed by the processor, cause the processor to:
receive, over a network from a one or more second computing devices associated with a user, a first performance submission of a first competitor,
wherein at least a subset of the first performance submission is electronically captured by a mobile device associated with the user, as the user participates in the multiple-stage sport activity, and is transmitted from a mobile device to the first computing device;
wherein the first performance submission comprises, at least one of:
a first course performance submission for a first sport activity participated by the first competitor and
a first training performance submission associated with a performance profile of the first competitor in which the profile corresponds to a sport activity type associated with a stage of the multiple-stage sport activity;
access competition data for one or more first scheduled multiple-stage sport activities associated with the first competitor;
wherein the one or more first scheduled multiple-stage sport activities define a part of a season within a virtual league for the first competitor;
determine a ranking of the first competitor among the plurality of competitors collectively forming the virtual league associated with the first competitor,
wherein the ranking is based at least in part upon an overall performance score of the first competitor with respect to one or more overall performance scores corresponding to the plurality of competitors,
wherein the overall performance score of the first competitor is determined based upon an individual performance score specific to one of the one or more first scheduled multiple-stage sport activities, wherein the individual performance score is determined based on either i) a course performance submission of the first competitor for the one of the one or more first scheduled multiple-stage sport activities or ii) a projection of a performance result of the first competitor for the one of the one or more first scheduled multiple-stage sport activities; and cause the ranking of the first competitor to be graphically displayed on the one or more second computing devices.

18. The system of claim 17, wherein the projection of the performance result of the first competitor for the one of the one or more first scheduled multiple-stage sport activities is determined by:
accessing, by the processor of the first computing device, second performance data of a plurality of second competitors, wherein a subset of the second performance data of the second competitors shares a common course attribute with the first performance submission of the first competitor; and
determining, by the processor of the first computing device, based upon the first performance submission and a subset of the second performance data, a performance rating for the first competitor, wherein the performance rating comprises one or more ratings specific to each stage of the multiple-stage sport activity, the performance rating being employed to determine the projection of the performance result of the first competitor with respect to a course rating associated with the one of the one or more first scheduled multiple-stage sport activities.

19. The system of claim 18, wherein the common course attribute comprises a member selected from the group consisting of:
a same course identifier of the multiple-stage sport activity;
a same distance rating for at least one stage of the multiple-stage sport activity; and
a same difficulty rating for at least one stage of the multiple-stage sport activity.

20. The system of claim 17, wherein the multiple-stage sport activity is a member selected from the group consisting of triathlon, biathlon, decathlon, heptathlon, modern pentathlon, octathlon, pentathlon, quadrathlon, tetrathlon, icosathlon, and aquathlon.

21. The system of claim 17, wherein the instructions, when executed, further cause the processor to:
cause a graphical representation of a first individual performance score and a second individual performance score to be graphically displayed on the one or more second computing devices, wherein the first individual performance score is based on the course performance submission for the one of the one or more first scheduled multiple-stage sport activities, and wherein the second individual performance score is based upon the projection of the performance result of the first competitor for the one of the one or more first multiple-stage sport activities; and
receive, from the one or more second computing devices, a selection between the first individual performance score and the second individual performance score.

22. The system of claim 17, wherein the instructions, when executed by the processor, cause the processor to:
adjust the individual performance score of the first competitor for the one of the one or more first multiple-stage sport activities, based upon a scoring compensation rate associated with the first competitor, wherein the scoring compensation rate is based upon at least one member selected from the group consisting of:
i) a demographic attribute and/or categorical attribute of the first competitor,
ii) a performance result of the first competitor in the one or more multiple-stage sport activities participated by the first competitor,
iii) a relative performance of the first competitor to other competitors in the one or more multiple-stage sport activities participated by the first competitor,
iv) a relative performance of the first competitor to a top athlete in the same demographic and/or category attribute with the first competitor in the one or more multiple-stage sport activities participated by the first competitor, and
v) training conditions associated with the first competitor.

23. The system of claim 17, wherein the instructions, when executed by the processor, cause the processor to:
adjust the individual performance score of the first competitor for the one of the one or more first multiple-stage sport activities based upon a scoring compensation rate associated with the first competitor, wherein the scoring compensation rate is based upon a purchasable score modifier, and wherein the degree of the adjustment is based upon how much money the user spends for the purchasable score modifier.

24. The system of claim 17, wherein the instructions, when executed by the processor, cause the processor to:
cause one or more purchasable score modifiers to be graphically presented on the one or more second computing devices, wherein the purchasable score modifiers comprise a member selected from the group consisting of: i) a one-time use accessory and ii) a semi-permanent use accessory;
receive, from the one or more second computing devices, a selected purchasable score modifier of the one or more purchasable score modifiers; and
cause an electronic payment transaction corresponding to a purchase of the selected purchasable score modifier to be processed, the transaction corresponding to a user account associated with the user of the one or more second computing devices.

25. The system of claim 17, wherein the competition data for the one or more first scheduled multiple-stage sport activities comprises a member selected from the group consisting of:
a future event date;
a future event identification; and
a stage rating information associated with the future event.

26. The system of claim 17, wherein a given user account of each competitor of the plurality of competitors membered to the virtual league of the first competitor includes one or more second scheduled multiple-stage sport activities, wherein a subset of the one or more second scheduled multiple-stage sport activities of a given competitor in the virtual league of the first competitor is different from the one or more first scheduled multiple-stage sport activities of the first competitor.

27. The system of claim 17, wherein the first training performance submission comprises a member selected from the group consisting of:
completion time information associated with a training session;
completion distance information of a training session;
completion rate information of the training session;
difficulty rating information associated with a training session; and
completion schedule information of a pre-defined set of training sessions.

28. The system of claim 17, wherein the first course performance submission comprises:
completion time information for one or more stages of the multiple-stage sport activity for the first competitor;

a competitor identifier identifying the first competitor; and
a course identifier of the multiple-stage sport activity participated by the first competitor.

29. The system of claim 28, wherein the course identifier is determined, by the processor, based upon one or more members of the group consisting of: GPS location data, wireless broadcasting data, and digital location data through mobile data.

30. A method for operating a platform to provide a virtual sport league for a sport activity, the method comprising:
receiving, by a processor of a first computing device, over a network from one or more second computing devices associated with a user, a first performance submission of a first competitor, wherein at least a subset of the first performance submission is electronically captured by a mobile device associated with the user, as the user participates in the multiple-stage sport activity, and is transmitted from a mobile device to the first computing device, the first course performance submission comprising:
wherein the first performance submission comprises, at least one of:
a first course performance submission for a first sport activity participated by the first competitor and
a first training performance submission associated with a performance profile of the first competitor in which the profile corresponds to a sport activity type associated with a stage of the multiple-stage sport activity;
accessing, by the processor of the first computing device, competition data for one or more first scheduled sport activities associated with the first competitor,
wherein the one or more first scheduled sport activities define a part of a season within a virtual league for the first competitor;
determining, by the processor of the first computing device, a ranking of the first competitor among the plurality of competitors collectively forming the virtual league associated with the first competitor,
wherein the ranking is based at least in part upon an overall performance score of the first competitor with respect to one or more overall performance scores corresponding to the plurality of competitors,
wherein the overall performance score of the first competitor is determined based upon an individual performance score specific to one of the one or more first scheduled sport activities, the individual performance score being determined based on either i) a course performance submission for the one of the one or more first scheduled sport activities or ii) a projection of a performance result of the first competitor participating in the given the one of the one or more first scheduled sport activities; and
causing, by the processor of the first computing device, the ranking of the first competitor to be graphically displayed on the first computing device.

31. A method of claim 30, wherein the sport activity is a member selected from the group consisting of a marathon, swimathon, cyclothon, biathlon, triathlon, decathlon, heptathlon, modern pentathlon, octathlon, pentathlon, quadrathlon, tetrathlon, icosathlon, and aquathlon.

* * * * *